Feb. 14, 1967 J. G. HARPER 3,304,403

LASER WELDING OF CONTACTS

Filed Oct. 14, 1963

JAMES G. HARPER
INVENTOR.

BY D. Carl Richards

United States Patent Office
3,304,403
Patented Feb. 14, 1967

3,304,403

LASER WELDING OF CONTACTS

James G. Harper, Garland, Tex., assignor to Texas Instruments Incorporated, Dallas, Tex., a corporation of Delaware Filed Oct. 14, 1963, Ser. No. 315,793
1 Claim. (Cl. 219—121)

This invention is directed to the attachment of conductive leads to semiconductor devices and more particularly to the laser welding of component leads.

In providing for electrical connections to appropriate terminals on subminiature circuit elements, the size and the thermal capacities of the elements limit the use of the known techniquies to but a few which are capable of meeting present requirements. The present invention is directed to a system for overcoming the limitations of prior art methods in which ball-type or chisel-type mechanical connections have been employed for terminating electrical leads on semiconductor devices.

In accordance with the present invention, there is provided a lead welding system for attachment to a semi-conductor wafer having at least one contact zone thereon. A laser including a laser crystal is supported in spaced relations from the wafer. A light conducting element focuses light from the laser onto the contact zone. Means are provided for positioning a conductor at the contact zone. Means are then provided for pulsing the laser to fuse the conductor to the contact zone. In a further aspect of the invention, the conductor is fed to the contact zone through the light concentrating means.

For a more complete understanding of the present invention and for further objects and advantages thereof, reference may now be had to the following description taken in conjunction with the accompanying drawings in which.

Figures 1, 2, 3:
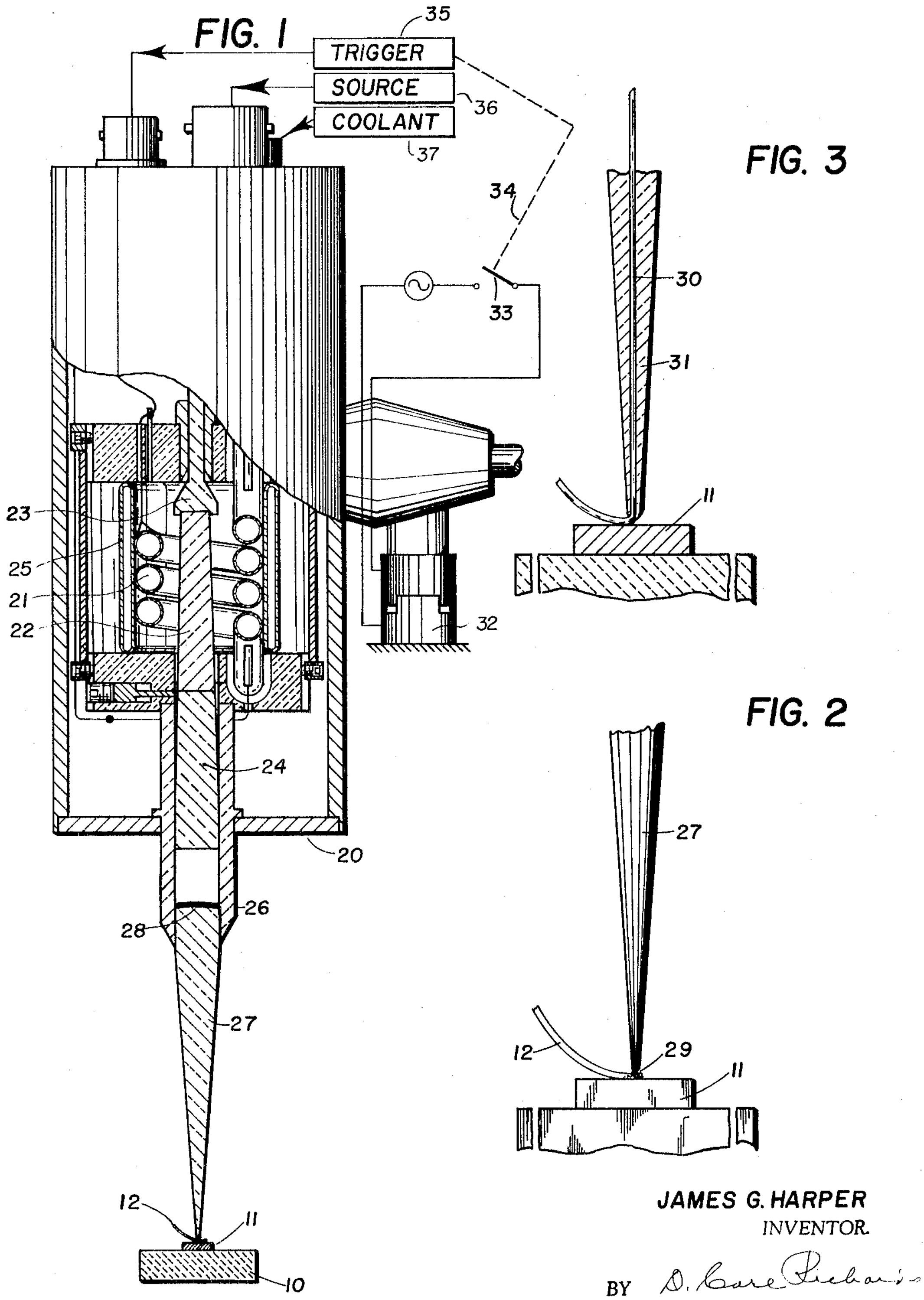
FIGURE 1 is a diagrammatic representation of the welding system of the present invention.
FIGURE 2 is an enlarged view of the light pipe unit.
FIGURE 3 is a sectional view of a hollow light pipe.

The present invention relates to welding a lead wire onto a contact zone on a subminiature element such as a transistor or other semiconductor devices. As illustrated in FIGURE 1, a semiconductor wafer 10 having a contact zone 11 is supported on a base plate 12. In contrast to prior art techniques where mechanical connections are made by leads to the contact zone, the present invention provides for the establishment of a weld between the lead 12 and the contact zone 11. The weld is completed by utilizing a laser 20 in which a controlled pulse of light from a flash lamp 21 is concentrated onto a laser crystal 22 to excite the same. The crystal 22 is positioned in a holder 23. The crystal is reflective at the upper end and transmissive at the bottom surface. A reflector unit 25 encompasses the laser crystal 22 for enhancing the intensity of the light concentrated on a crystal 22. With each pulse of the flash lamp 21, an intense monofrequency light beam is emitted from the laser output 26. In accordance with the present invention, the light beam from the output 26 is concentrated by an optical element 27 to produce high intensity light radiation at the surface of the contact 11 and the lead 12.

In one embodiment of the invention as illustrated in an enlarged scale in FIGURE 2, the element 27 is a solid light pipe. Pipe 27 has a slightly convex upper surface

28. The lower end is drawn to a relatively fine point 29.

In operation, the lead 12 is held adjacent to contact 11 at the optical axis of the laser. Energy from a light pulse in the laser 20 is directed as a laser beam onto the contact 11 to fuse the lead 12 with the contact 11.

In the embodiment shown in FIGURE 3, a tubular light pipe is employed in which lead wire 30 from a suitable supply spool is threaded downward through the central aperture in a pipe 31. The upper end of the hollow light pipe 31 is convex with the lower end pointed to concentrate light from each laser pulse on the portion of the lead conductor at the end thereof.

In one embodiment of the invention, a laser of the type manufactured and sold by Hughes Aircraft Company and identified as Laser Model 200 was employed. The laser had a peak optical output of 20 kw. at 6943 A. The laser crystal was 1½ x ⅜ inch, high quality ruby crystal with multilayer dielectric reflectors on the ends thereof. Stored electrical energy is converted into a highly intense narrow beam of monochromatic light of infrared energy. The above-identified unit is relatively small physically, but is of power capabilities such as to accomplish the welding operations desired. The light pipes 27 and 31 of FIGURES 2 and 3, respectively, were made of polished quartz but may be made of any other suitable material, Pyrex for example. They may have a diameter of about 0.50 inch and of length of the order of 4 inches. The concentration of the beam at the welding site was found to be adequate. Gold contact zones reflect up to 99% of the beam, which tends to minimize the energy actually used in the weld. Reflection from aluminum is of the order of 70% to 90%. Even so, the system employed has been found satisfactory for welding lead wires 0.0007 to 0.002 inch in diameter with gold. Aluminum, platinum, nickel, and silver alloys all have been successfully welded. Weld zones have been formed having diameters of about 0.005 inch when using 0.002 lead wire. Use of 0.0007 mil lead wire makes possible the use of this joining technique even for the smallest of devices and the fabrication of integrated surfaces having microscopic welding sites.

As illustrated in FIGURE 1, the laser 20 is supported on a spring-biased piston unit 32 which may be actuated by closure of a switch 33 to lower the laser 20. When the laser is pulsed, pressure may be applied by way of the light pipe 27 to the lead 12 to maintain it intimately in contact with the conductive zone 11. The laser unit is normally elevated above the site of the conductor 12, but may be lowered to establish and maintain contact during the welding operation. Contact between light pipe 27 and wire 12 is not necessary for fusion. Switch 33 is coupled as by linkage 34 to a trigger source 35. Energy from a storage unit 36 is thus applied to the flash tube 21 at a time when the lead 12 is held in position. Coolant from a source 37 is employed in the operation.

Having described the invention in connection with certain specific embodiments thereof, it is to be understood that further modifications may now suggest themselves to those skilled in the art and it is intended to cover such modifications as fall within the scope of the appended claim.

What is claimed is:

A system for securing a miniature electrical lead which comprises:

(a) a component having at least one contact zone thereon, (b) a laser crystal supported in axial alignment with said zone, (c) light concentrating means to direct light from said laser to focus on said zone, (d) a conductor extending through said concentrating means into contact with said zone, and (e) means for pulsing said laser to fuse said conductor to said zone.

References Cited by the Examiner

UNITED STATES PATENTS

| | | | |
|---|---|---|---|
| 3,050,617 | 8/1962 | Lasch et al. | 219—85 |
| 3,096,767 | 7/1963 | Gresser et al. | |
| 3,107,296 | 10/1963 | Hine | 219—121 X |

JOSEPH V. TRUHE *Primary Examiner.*